United States Patent [19]

Kim

[11] Patent Number: 5,432,558
[45] Date of Patent: Jul. 11, 1995

[54] CIRCUIT AND METHOD FOR TRANSMITTING/RECEIVING A CODE-INSERTED VIDEO SIGNAL

[75] Inventor: Duck-Hwan Kim, Kyungki-do, Rep. of Korea

[73] Assignee: SamSung Electronics Co., Ltd., Kyungki-do, Rep. of Korea

[21] Appl. No.: 142,909

[22] Filed: Oct. 29, 1993

[30] Foreign Application Priority Data

Oct. 31, 1992 [KR] Rep. of Korea ............... 20398/1992
Oct. 16, 1993 [KR] Rep. of Korea ............... 21545/1993

[51] Int. Cl.6 .............................................. H04N 7/04
[52] U.S. Cl. ..................... 348/460; 348/906; 348/478
[58] Field of Search ............... 348/460, 461, 478, 466, 348/473, 563, 731, 734, 906, 7; 380/10; H04N 7/04, 7/087

[56] References Cited

U.S. PATENT DOCUMENTS

| | | | |
|---|---|---|---|
| 4,691,351 | 9/1987 | Hayashi et al. ............... | 348/906 |
| 4,706,121 | 11/1987 | Young . | |
| 4,805,020 | 2/1989 | Greenberg ........................ | 348/473 |
| 4,908,707 | 3/1990 | Kinghorn . | |
| 4,977,455 | 12/1990 | Young . | |
| 5,016,273 | 5/1991 | Hoff .................................. | 348/563 |
| 5,063,456 | 11/1991 | Horiuchi et al. . | |
| 5,179,439 | 1/1993 | Hashimoto ........................ | 348/731 |
| 5,195,134 | 3/1993 | Inoue ................................ | 348/906 |
| 5,210,611 | 5/1993 | Yee et al. . | |
| 5,260,788 | 11/1993 | Takano et al. .................... | 348/478 |

Primary Examiner—Victor R. Kostak
Attorney, Agent, or Firm—Robert E. Bushnell

[57] ABSTRACT

A circuit and method for performing a specific function at a receiving side if a video signal in which a code is inserted is transmitted. A transmitting side of a broadcasting system transmits a video signal in which a given code relating to a specific function like a time correction or a program reservation of a receiving side is inserted. The receiving side detects the code and then transmits the detected code to a circuit for performing the specific function by inputting a one touch key. Without the key input of a user, the corresponding time correction function is automatically controlled according to the code detected from a received video signal.

20 Claims, 6 Drawing Sheets

CIRCUIT AND METHOD FOR TRANSMITTING/RECEIVING A CODE-INSERTED VIDEO SIGNAL

BACKGROUND OF THE INVENTION

The present invention relates to television broadcasting systems, and more particularly, to a circuit and method for performing a specific function at a receiving side by use of a code transmitted from a transmitting side when a video signal, in which the code for controlling the specific function of the receiving side is inserted, is transmitted.

Generally, a television or video tape recorder (VTR) has a timer function. I have observed however that this function may not be reliably used for example, in an area in which frequent power failures occur. It is also a problem if a user either thinks that it is simply too much trouble to adjust the time or does not know the routine required by an appliance for adjusting the time. Moreover, in preparation of a power failure, a battery may be used as the backup source of electric power. If the user forgets to replace the battery however, a timer needs to be manually adjusted. If the timer function does not work, then a scheduled recording of a program also will not operate. Therefore, it is very important in some cases, to adjust the timer to the correct time. Although such convenient functions as the pre-set turn-on of appliances such as televisions and video tape recorders have been provided as built-in functions, in a television or in a video recording machine, it is my conclusion that it is unfortunate that these convenient functions can not be reliably used due to problems in keeping the onboard time maintained by the appliance correctly adjusted.

Typically, a broadcast station notifies a viewer of specific programs prior to the normally scheduled broadcast of the programs. If it is desired to reserve the recording of a program, the viewer needs to press multiple keys on a keyboard of the VTR or a remote controller. By way of example, in the *Video Cassette Recorder Programming Via Teletext Transmissions* described by U.S. Pat. No. 4,908,707 to John R. Kinghorn, the reservation of recording a broadcast is accomplished by selecting a desired program by use of a cursor from among the contents of a schedule received as a teletext transmission that is displayed on teletext pages of the television screen. It seems to me that this method is inconvenient because the user has to press several keys repeatedly, i.e., the user must select a teletext page corresponding to a source, a cursor key must be pressed several times to obtain alignment with the desired program, and a record that key must be pressed to store the necessary information in a memory of the video recorder.

In the *System And Process For VCR Scheduling* mentioned in U.S. Pat. No. 4,977,455 to Patrick Young, a cue, i.e., an audio sound or a visual symbol or message generated by a microprocessor in response to a broadcast indicating the availability of supplemental information relating to the broadcast received at a teletext receiver, is displayed on the television screen. The user must however, operate a store key on the remote control in near synchronism with the cue to store schedule information and to thereby program the appliance to automatically record the supplemental information when it is broadcast.

The TV Schedule System And Process embodiment shown in U.S. Pat. No. 4,706,121 to Patrick Young schedule information is transmitted either in the vertical or horizontal blanking interval or as a separate broadcast, such as a frequency modulation (FM) broadcast. Menus are displayed on the television screen and the user, by accurately manipulating a plurality of keys on a keyboard of a remote control in the correct sequence, for example, may select desired information to be stored so as to automatically control a television tuner or a video recorder to record certain programs. The stored information is automatically updated (without user interaction) in case of a schedule change regarding when the program is actually broadcast. Error checking and/or correction is performed on each block of data transmitted.

A more recent effort is represented by the *Automatic Tuning Radio/TV Using Filtered Seek* described in U.S. Pat. No. 5,210,611 to Yee et al., where a tuner is controlled according to digital information transmitted in either the vertical blanking interval of the television signal or in an FM subcarrier on an audio signal, while in the *Video Signal Processor* of U.S. Pat. No. 5,063,456 to Horiuchi et al. endeavors to eliminate data in the vertical blanking interval in order to insert time codes therein, in an effort to provide an accurate time code reading in a video tape recorder fitted with a circuit for recording or reproducing time code signals. However, the time codes are not directed towards real time but are instead for designating tape locations (addresses). Accordingly, the time codes in Horiuchi et al. can not be used to adjust the timing circuit of a VTR according to real time.

SUMMARY OF THE INVENTION

It is therefore an object of the present invention to provide an improved circuit and process for programming an appliance.

It is another object to provide a circuit and process for enabling accurate chronological programming of an appliance.

It is yet another object to provide a circuit and a process which simplify the programming of an appliance.

It is still yet another object to provide a circuit for transmitting a video signal in which a given code for controlling a specific function of a receiving side is inserted.

It is a further object to provide a circuit for detecting an inserted code from a received video signal so as to automatically control a specific function corresponding to the code.

It is a yet further object to provide a circuit and method for performing a specific function at a receiving side by use of a code transmitted from a transmitting side if a video signal in which the code for controlling the specific function of the receiving side is inserted is transmitted.

It is a still further object to provide a method for automatically adjusting a current time by detecting a time code and single keying of a time correction key if a video signal in which the time code is inserted is transmitted.

It is also an object to provide a method for automatically reserving the recording of a program by one stroke of a reservation key during the detection of the program reservation code inserted in a specific area of a video signal which is transmitted from the transmitting side.

These and other objects may be achieved in accordance with one aspect of the present invention, by a transmitting side of a broadcasting system transmitting a video signal in which a given code relating to a specific function of an appliance on a receiving side is inserted. The appliance on the receiving side detects the code and then transmits the detected code to a circuit within the appliance for driving the specific function of the appliance corresponding to the code in response to a one-touch keystroke by the user of the receiving appliance.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
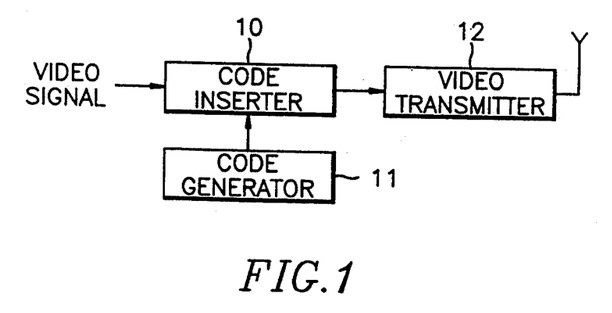
FIG. 1 is a schematic diagram of a transmitting circuit constructed according to the principles of the present invention.

Turning now to the drawings, FIG. 1 illustrates the configuration for inserting a code relating to a specific function such as time correction or reservation of a receiving side for a video signal to be sent from a transmitting side. A given code generated from a code generator 11 is inserted in the video signal in a code inserter 10 and then transmitted to a receiving circuit through a video transmitter 12. The video signal includes a vertical blanking interval (VBI). Strictly speaking, the code is to be inserted in the VBI prior to transmission.

Figure 2:
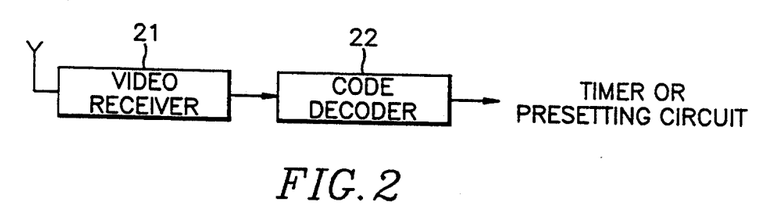
FIG. 2 is a schematic diagram of a receiving circuit constructed according to the principles of the present invention.

FIG. 2 illustrates the configuration for decoding the code-inserted video signal at a receiving side and sending the code to a timer circuit or a reservation circuit. A video receiver 21 receives the video signal transmitted from the transmitting side. A code decoder 22 detects the code from the video signal and provides the code to the timer circuit or the reservation circuit of a TV or VTR.

Figure 12:
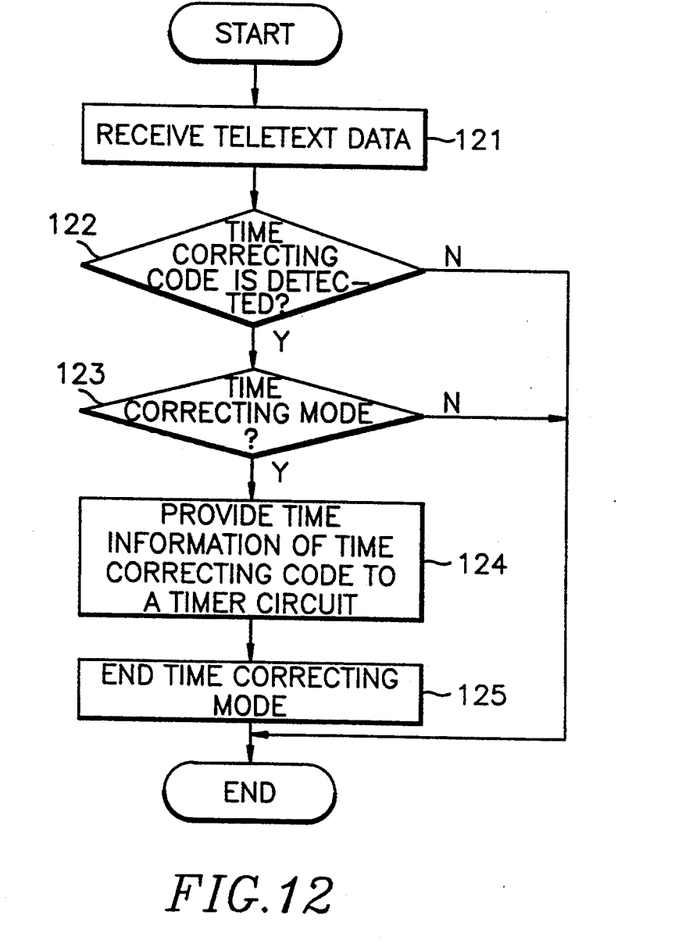
FIG. 12 is a flow chart illustrating a series of time corrective processes performed according to the principles of the present invention.

Adjusting a current time and reserving the recording of a program (i.e. storing information to automatically control a television to come on a certain channel or a recorder to come on and/or record a program on a certain channel) in a TV or a VTR will now be described. If the user selects a time correcting instruction by use of a remote control unit or other input unit in order to accurately adjust time of the TV or VTR, the TV or VTR controls the timer circuit by detecting and decoding a time code inserted in an empty area of a video signal channel transmitted from a broadcasting station. Therefore, the time is automatically adjusted. When the user selects the time correcting instruction, if the time code is not detected, the TV or VTR is maintained in a stand-by state. If the time code is detected, the time is adjusted and then a time correcting mode is turned off. If the code decoder is accurate, it will be desirable to update the time by real time processing without the time correcting instruction of the user. In FIG. 12, a series of time correcting control steps are illustrated. It is assumed that the time code having time information is teletext data. At step 123, a time correcting mode represents a mode set by the time correction instruction of the user using the remote control unit or other input unit.

Figure 13:
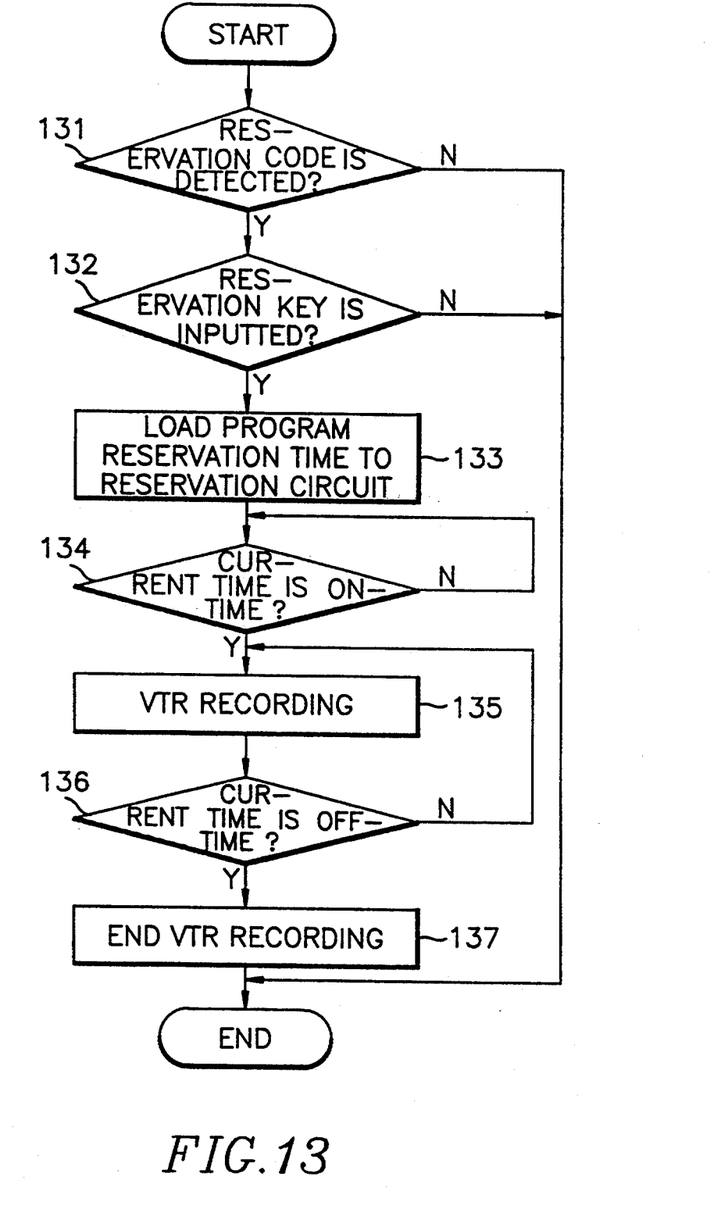
FIG. 13 is a flow chart illustrating a series of reservation processes performed according to the principles of the present invention.

Assuming that a time reservation mode is completed, the broadcasting station of the transmitting side transmits the video signal in which the code having channel information and time information for reservation of recording a program is inserted during program notice broadcasting (i.e. a commercial or preview regarding a program to be transmitted at a later time). Then the TV or VTR of the receiving side turns on a display lamp by decoding the code. In this case, if the user who is watching the TV senses the display lamp which is turned on and then wants to reserve the recording of the program and presses a reservation key in the remote control unit or other input unit, the program reservation information decoded from the code is provided to the reservation circuit. The reservation key is a one-touch key which may be activated by touching the key one time. Thus, the reservation for recording of the program is automatically implemented. Since the user can reserve the recording of the program while watching the program notice being broadcast and the reservation of the recording of the program is simply performed by a one-time procedure implemented by the user having to touch activate the reservation key by a single touch, it is very convenient. A series of reservation process is shown in FIG. 13.

Figure 3:
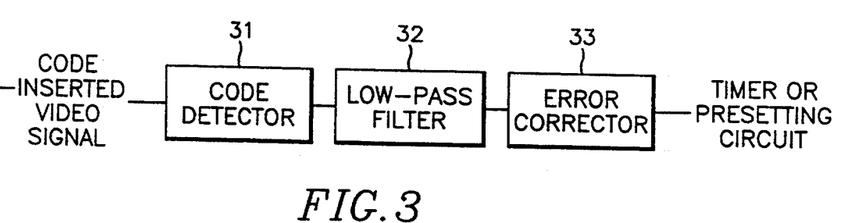
FIG. 3 is a block diagram showing a first embodiment of a receiving circuit constructed according to the principles of the present invention.

FIG. 3 illustrates a first embodiment of the receiving circuit of FIG. 2. The receiving circuit includes a code detector 31, a low-pass filter 32 and an error corrector 33. If the code-inserted video signal which is the same as the input of the timer circuit or the reservation circuit of the TV or VTR are sent from the broadcasting station, the code detector 31 detects the code from the VBI in which the code is inserted and the low-pass filter 32 eliminates a noise component contained in the detected code. The error corrector 33 checks whether or not the code is normally received and sends the code to the timer circuit if the time correction key has been activated or the reservation circuit if the reservation key has been activated.

Figure 4:
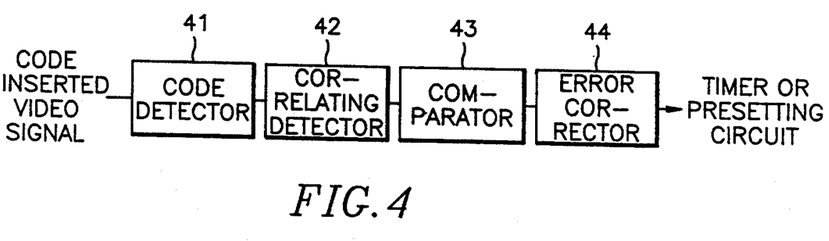
FIG. 4 is a block diagram showing a second embodiment of a receiving circuit constructed according to the principles of the present invention.
Figure 10:
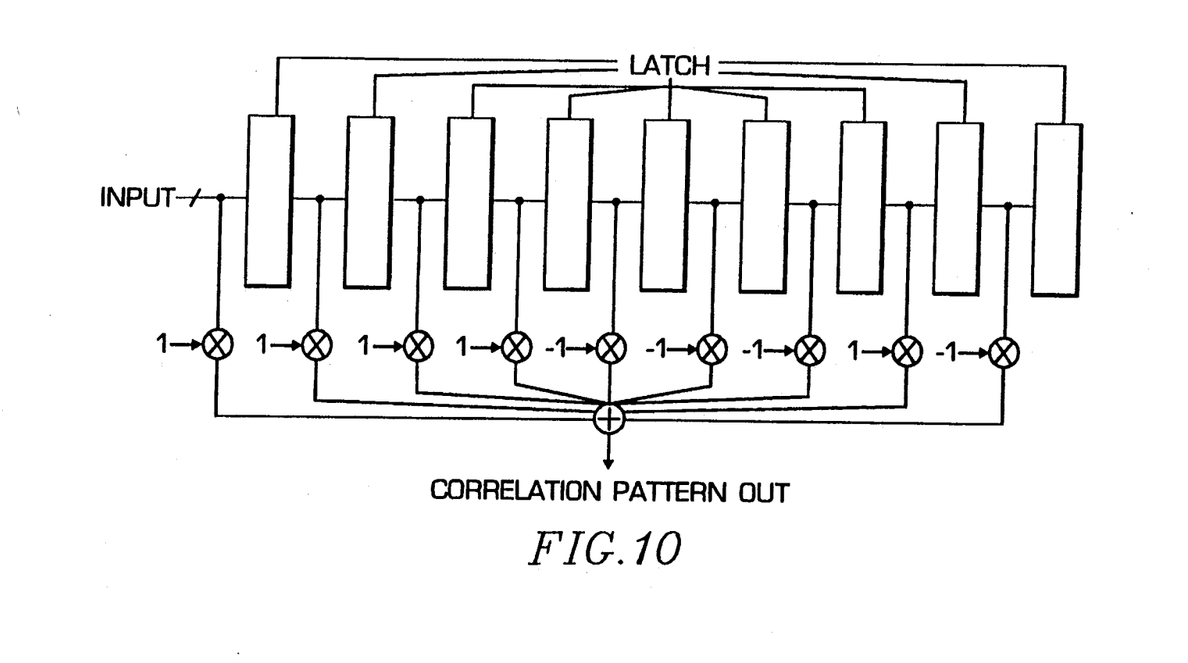
FIG. 10 shows the general structure of a correlating detector.

FIG. 4 illustrates a second embodiment of the receiving circuit of FIG. 2. There are provided a code detector 41, a correlating detector 42, a comparator 43 and an error corrector 44. The correlating detector 42 is known in the art and disclosed in detail in Korea patent No. 90-13136 entitled *Filtering Method In A Converting Domain Using Pipeline Structure* attached and incorporated herein. The structure of the correlating detector 42 is shown in FIG. 10.

Figure 6:
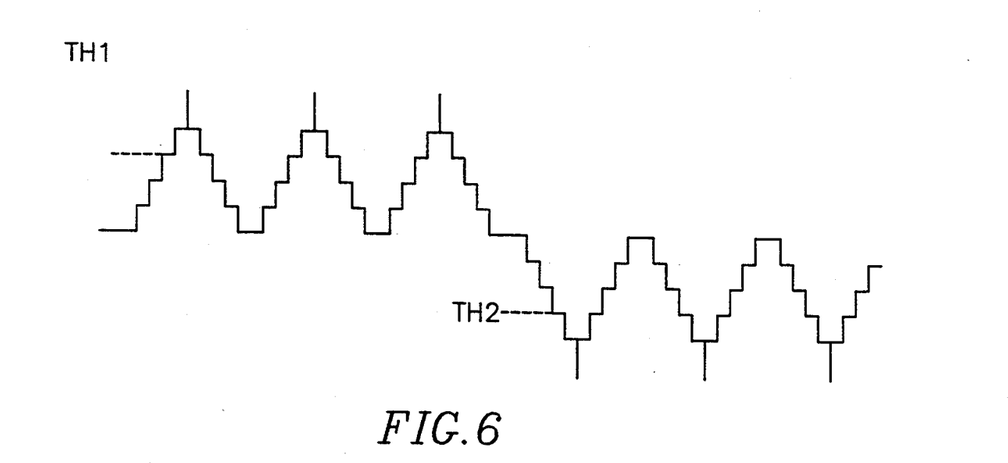
FIG. 6 is a waveform chart showing a pattern signal passing through a correlating detector.

If the code detected from the code detector 41 passes through the correlating circuit 42, a waveform shown in FIG. 6 is generated. In order to guarantee accuracy, the comparator 43 generates "1" (or "0") when the waveform is greater than a first threshold value TH1 and generates "0" (or "1") when it is less than a second threshold value TH2. Otherwise the waveform is not considered as the code. Namely, if a correlated degree is greater than a first level or less than a second level, it is judged as a code, and if the correlated degree is between the two levels, it is judged as a video signal. Then the error corrector 44 executes a parity check in order to confirm that the code is accurately received. If it is confirmed that an accurate code is received, the display lamp is turned on so as to notify the user that the reservation of a program is possible.

Thus if the code having channel information and time information is sent from the broadcasting station during the program notice broadcasting for a specific program, the recording time reservation can be automatically implemented by pressing a reservation key only once. That is, since the code is provided to the reservation circuit of the TV by the key input of the user, the TV is automatically turned on at the time corresponding to the time information of the code and the program is recorded on the tape in the VTR or other video recording machine. In the circuit structure so far described, the patterned bit of the code is transmitted from the broadcasting station. In other words, the waveform of a shape such as the coefficient of the correlating detector 42 is considered as one bit.

Figure 5A:
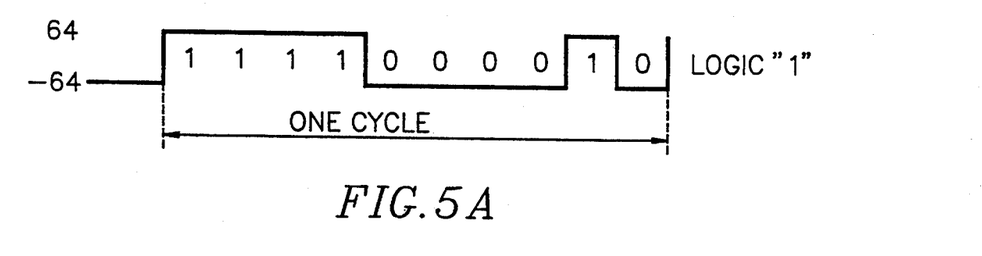
FIG. 5A shows one example of a code pattern formulated according to the principles of the present invention to include two frequency components.
Figure 5B:
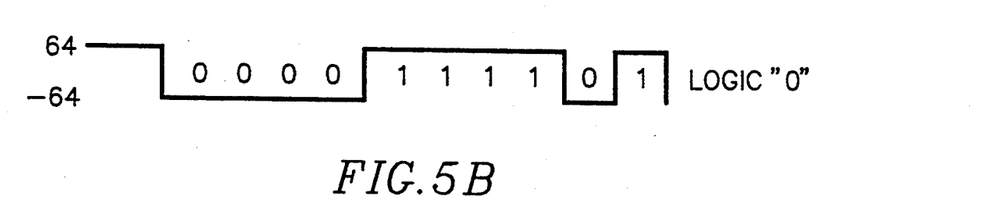
FIG. 5B shows another example of a code pattern formulated according to the principles of the present invention to include two frequency components.
Figure 7:
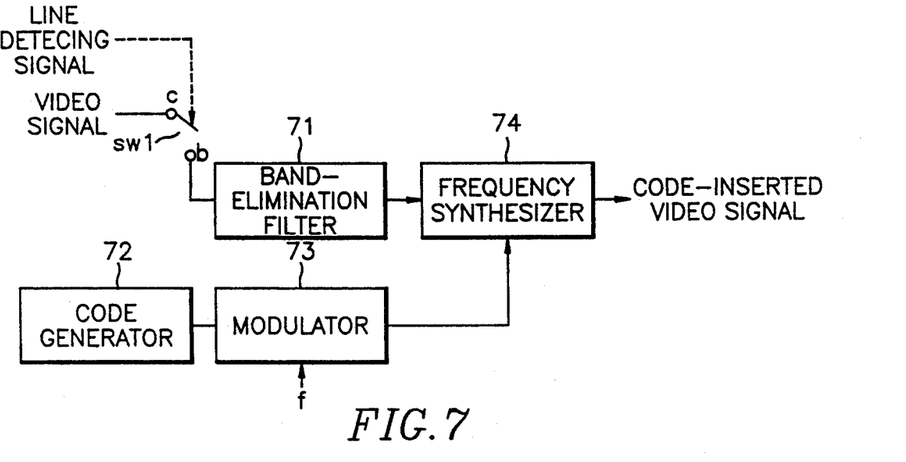
FIG. 7 is a block diagram showing a first embodiment of a transmitting circuit constructed according to the principles of the present invention.

FIG. 7 illustrates a further embodiment of the transmitting circuit of FIG. 1. The transmitting circuit includes a band-elimination filter 71, a code generator 72, a modulator 73 and a frequency synthesizer 74. When a vertical blanking interval does not have a position where the code can be inserted, then one of the code signals shown in FIGS. 5A and 5B is inserted in an empty frequency band of the video signal by frequency modulation. If there is no empty frequency band, the code signal is inserted into a specific frequency band, as explained below. A broadcasting station is set up as one of either a first type in which the time correction code and the program reservation code is inserted into the vertical blanking interval of the video signal, or a second type in which the time correction code and program reservation code is inserted into a specific frequency band of predetermined line of the video signal. Code generator 72 generates a code signal having a format as shown in either FIG. 5A or FIG. 5B so as to enable a decoder in a receiving circuit to respond to a code inserted video signal transmitted by a broadcasting station of the second type. When there is an empty frequency band, band-elimination filtering is not performed. If there is no empty frequency band, a common terminal of a switch SW1 is connected to a terminal b in response to a line detecting signal. The line detecting signal is generated according to a method well known in the art and is indicative of a predetermined line of the video signal. Then the band-elimination filter 71 subtracts a specific frequency f from the input video signal and transmits the resultant signal to the frequency synthesizer 74. The modulator 74 modulates the code generated from the code generator 72, i.e. the code signal of either FIG. 5A or FIG. 5B and the time correction code or the program reservation code, to the specific frequency f and transmits the modulated signal to the frequency synthesizer 74. The frequency synthesizer 74 inserts the modulated code into the video signal of which the specific frequency band has been eliminated and thus generates the code-inserted video signal.

Figure 8:
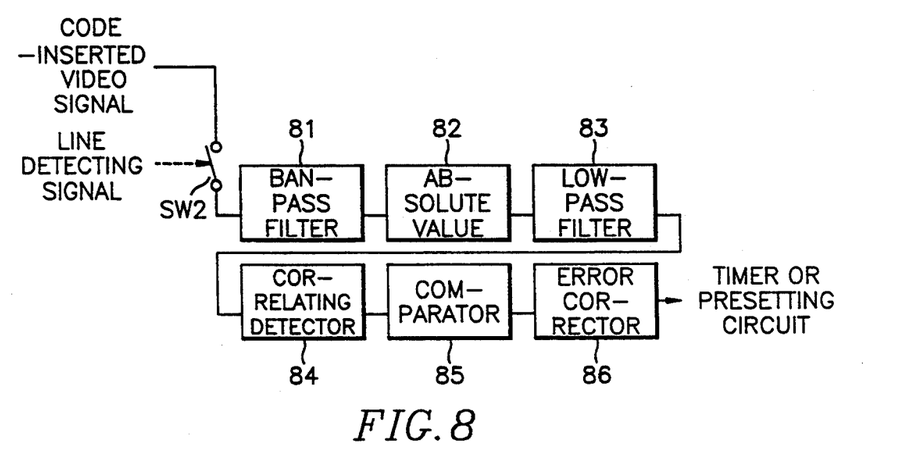
FIG. 8 is a block diagram showing a third embodiment of a receiving circuit constructed according to the principles of the present invention.

FIG. 8 shows another embodiment of the receiving circuit of FIG. 2. The receiving circuit has a band-pass filter 81, a demodulator comprised of an absolute value circuit 82 and a lowpass filter 83, a correlating detector 84, a comparator 85 and an error corrector 86. When a line in which the modulated code is contained is detected in a code inserted video signal transmitted from the transmitting circuit shown in FIG. 7, switch SW2 provides the code inserted video signal to a band-pass filter 81 which in turn extracts the modulated signal. The absolute value circuit 82 calculates an absolute value of the extracted signal for signal restoration and the low-pass filter 83 eliminates a noise component. The correlating detector 84 forms a mutual correlating function between the noise-eliminated absolute value and a code format. Although the result of the correlating detection is judged as code data, the comparator 85 checks the waveform generated from the correlating detector 84 once again to confirm the code data. If the waveform is greater than the first threshold value TH1, the comparator 85 generates "1", and if the waveform is less than the second threshold value TH2, it generates "0". The error corrector 86 parity-checks the compared result to confirm whether or not the code is normally received. If the normal reception is confirmed, the error corrector 86 transmits the code to the timer circuit or the reservation circuit. The correlating detector 84, comparator 85 and error corrector 86 are added to improve reliability and these are optional devices.

Figure 9:
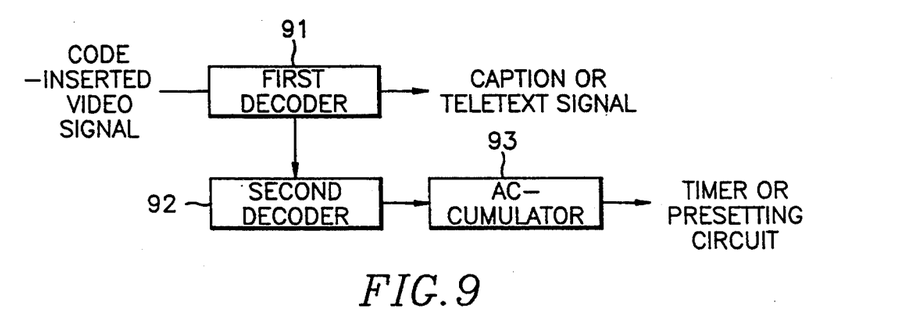
FIG. 9 is a block diagram showing a fourth embodiment of a receiving circuit according constructed according to the principles of the present invention.

FIG. 9 shows yet another embodiment of the receiving circuit of FIG. 2. The receiving circuit has first and second decoders 91 and 92, and an accumulator 93. The first decoder 91 decodes the video signal to detect a teletext or caption signal. The second decoder 92 again decodes the result decoded from of the first decoder 91. The accumulator 93 counts how many times the same code is repeatedly received and accumulates the result decoded from the second decoder 92. The accumulator 92 is to improve reliability and this is also an optional device. Although not shown in FIG. 8, if the accumulator is connected to the receiving circuit of FIG. 8, since the code data is judged as effective data when it is received as much as a given number, the reliability is improved. If the receiving circuit has the accumulator, the transmitting circuit should include a corresponding unit.

As a method for inserting the code in the video signal at the transmitting side, first a mode is assigned to serially transmit the code-inserted video signal by the unit of field or frame. In order to clarify the field, a code for the field or frame should be additionally inserted in an NTSC broadcasting system. That is, a multiplexing system of time base is used. For example, first field: reservation, on/off, week, date, AM/PM, minute.

second field: hour, channel.

Second, all the information is coded on one line. In this case, an operation is implemented irrespective of the field. Third, the caption or teletext broadcasting is used. At the transmitting side, the caption or teletext broadcasting code is used as a code relating to the timecast or the reservation of time. If a specific character, character string or code is previously defined at the transmitting side and then the code is inserted, the receiving circuit decodes the code through the first decoder 91 so as to transmit the code to the timer circuit or the reservation circuit. In this case, although a traditional device is well used, since it is slightly difficult to directly send an image pattern, it is desirable to add the accumulator in order to guarantee the accuracy of the signal.

To raise accuracy during reception of the code, the code inserted in the video signal should satisfy the following conditions:

1. to increase the number of pixels of a pattern. (to increase the number of taps of the correlating detector.)
2. to insert patterns of various periods, and at the receiving side, to express the patterns to one bit by accumulating the patterns.
3. to repeatedly transmit the code during many fields.
4. to contain various frequency components on a pattern. (FIGS. 5A and 5B show examples of the pattern including two frequency components.)
5. to raise the threshold values TH1 and TH2 of the receiving side. (but if these values are too high, the code may fail to be recognized.)

Figure 11:
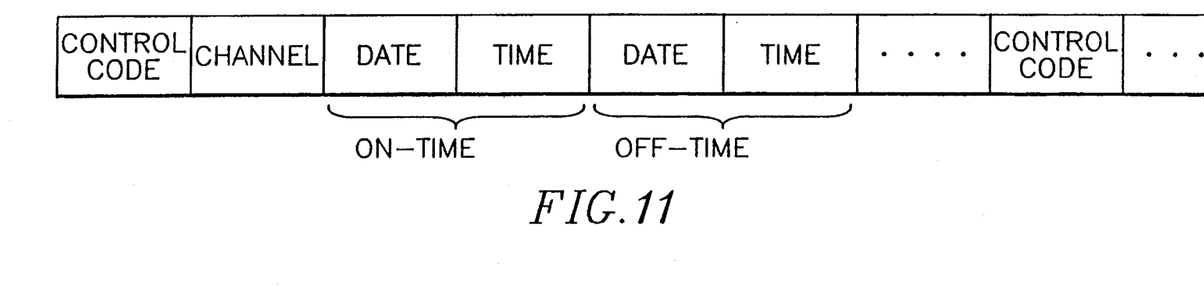
FIG. 11 shows a code format arranged according to the principles of the present invention.

FIG. 11 shows one example of a code format, and various modifications are possible. FIG. 11 shows, for example, a control code, which may be as shown in FIGS. 5A and 5B for example or may be a well known teletext/caption control code. Following the control code is a channel identification which informs the reservation circuit which channel a program will be broadcast on. After the channel identification a date and time is provided for the start of the program and a date and time for the end of the program. These date and time codes may be used to turn on and turn off the receiving device, respectively.

In addition to the time correction and the time reservation, there are various functions for automatically controlling the receiving side. Therefore, the inventive circuit and method can be applied to a dedicated channel for announcing a program, a high definition television (HDTV), and the like. If the TV broadcasting station or community cable broadcasting station provides such services, convenient functions can be expected. Further, it is possible to be applied between a TV or other machine.

While preferred embodiments of the present invention have been particularly shown and described, it will be understood by those skilled in the art that foregoing and other changes in form and details may be made without departing from the spirit and scope of the present invention.

What is claimed is:

1. A circuit for transmitting/receiving a video signal, comprising:

transmitting means for generating a first code for controlling a time correction function of a receiving side and a second code for controlling a program reservation function of a receiving side, and for inserting said first and second codes into a predetermined line of said video signal and transmitting the code inserted video signal;

means at said receiving side for receiving said code inserted video signal;

detecting means for detecting said first and second codes from said code inserted video signal received from said transmitting means; and code processing means for decoding the detected first code so as to perform said time correction function in response to user activation of a time correction key one time and for decoding the detected second code so as to perform said program reservation function in response to user activation of a reservation key one time.

2. The circuit as claimed in claim 1, wherein said predetermined line is a line of the vertical blanking interval.

3. The circuit as claimed in claim 1, wherein said transmitting means comprises:

a code generator for generating said first and second codes;

a code inserter for receiving said video signal and said first or second code generated by said code generator for inserting said first or second code into said predetermined line to produce said code inserted video signal; and a video transmitter for transmitting said code inserted video signal.

4. The circuit as claimed in claim 3, wherein said predetermined line is a line of the a vertical blanking interval of said video signal.

5. The circuit as claimed in claim 1, wherein said detecting means comprises a code detector for detecting said first or second code transmitted in said predetermined line of said code inserted video signal and outputs said detected code.

6. The circuit as claimed in claim 5, wherein said code processing means comprises:

a low pass filter for removing noise in said detected code; and an error corrector for determining whether said detected code is normally received and for transmitting said detected code, when normally received, to a timer circuit or a reservation circuit.

7. The circuit as claimed in claim 5, wherein said code processing means comprises:

a correlating detector for receiving said detected code and for outputting a waveform indicative of a correlation degree of said detected code;

a comparator for comparing said waveform to first and second threshold values, wherein said waveform is judged to be a video signal if said waveform is determined to be between said first and second threshold levels and said waveform is judged to be said detected code if said waveform has a value greater than said first threshold value or less than said second threshold value;

an error detector for receiving said detected code from said comparator for executing a parity check of said detected code to confirm that an accurate code has been received, said error detector providing, if said detected code is determined to be accurate, said detected code to a timer circuit in response to a time correction key being operated one time or a reservation circuit in response to a reservation key being operated one time.

8. The circuit as claimed in claim 1, wherein said transmitting means comprises:
   filtering means for extracting a specific frequency component from said predetermined line of said code inserted video signal;
   code generating means for generating said first or second code;
   modulation means for modulating said first or second code to said specific frequency component for generating a modulated code; and
   frequency synthesizer means for inserting the modulated code in said predetermined line of said video signal and transmitting the code-inserted video signal to said receiving side.

9. The circuit as claimed in claim 8, wherein said detecting means comprises:
   first filtering means for extracting a modulated signal from said predetermined line of said code inserted video signal.

10. The circuit as in claim 9, further comprising:
    second filtering means corresponding to said modulated code for calculating an absolute value of said extracted modulated signal and for low-pass filtering the calculated absolute value to eliminate a noise component to generate a demodulated signal.

11. The circuit as in claim 10, wherein said code processing means comprises:
    error correcting means for checking for an error of said demodulated signal and transmitting the error corrected code to a timer circuit in response to a time correction key being operated one time or a reservation circuit in response to a reservation key being operated one time.

12. The circuit as in claim 11, wherein said error correcting means comprises:
    means for obtaining a mutual correlating function between the demodulated signal and a desired code format, and for checking a correlated degree, said demodulated signal being regarded as code data if said correlated degree is greater than a first level or less than a second level, and said demodulated signal being regarded as a video signal if said correlated degree is between said first and second levels.

13. The circuit as in claim 1, wherein said first code contains real time information and said second code contains program information.

14. The circuit as in claim 13, wherein said code processing means automatically adjusts the time of a timer circuit in said receiving side in response to said time information in said first code and automatically programs a reservation circuit in said receiving side in response to said program information in said second code.

15. An apparatus for transmitting a video signal from a transmitting device and for receiving said video signal at a receiving device responsive to a time correction key and a reservation key, said apparatus comprising:
    transmitting means for generating a first code having real time information and a second code having broadcasting channel and time information of a corresponding program to be generated, and for inserting said first code or said second code in said video signal and transmitting the code inserted video signal;
    means for detecting said first code or said second code in said code inserted video signal received from said transmitting means;
    means for automatically adjusting a timing circuit in response said first code when said time correction key is activated a single time;
    displaying means for providing an indication that said second code has been detected; and
    means responsive to a single activation of said reservation key for storing said channel and time information in response to said second code for controlling said receiving device to automatically display or record said corresponding program.

16. A method for correcting time in a television receiver having a timer circuit and being connectable to receive from a broadcast station a video signal containing a time correcting code, said method comprising the steps of:
    detecting said time correcting code from the video signal received by the receiver;
    checking at the receiver whether a correction key is activated by a user; and
    decoding said time correcting code when said correction key is activated one time and correcting the current time according to the decoded time correcting code in said timer circuit.

17. A method for transmitting/receiving a code inserted video signal, comprising the steps of:
    inserting a first code and a second code into a predetermined line of a video signal, wherein said first code controls a time correction function at a receiver and said second code controls a program reservation function at said receiver, for producing a code inserted video signal;
    transmitting said code inserted video signal;
    receiving said code inserted video signal;
    detecting said first and second codes and separating said first and second codes from said code inserted video signal; and
    decoding the detected and separated first code so as to perform said time correction function in response to user activation of a time correction key one time and for decoding the detected and separated second code so as to perform said program reservation function in response to user activation of a reservation key one time.

18. The method as set forth in claim 17, wherein said predetermined line is a line in the vertical blanking interval of said video signal.

19. The method as set forth in claim 17, wherein said inserting step comprises the step of inserting said first and second codes into a vertical blanking interval of said video signal; and said detecting step comprises the step of detecting the vertical blanking interval of said video signal.

20. The method for transmitting/receiving a code inserted video signal, comprising the steps of:
    detecting a predetermined line of a video signal;
    eliminating a band of said video signal, said band having a specific frequency, in response to said detected predetermined line;
    generating a modulated code by modulating one of a first code and a second code by said specific frequency, wherein said first code controls a time correction function at a receiver and said second code controls a program reservation function at said receiver;

inserting said modulated code into said video signal in place of the eliminated band, to produce a code inserted video signal;

transmitting said code inserted video signal;

receiving said code inserted video signal;

extracting said modulated code from said code inserted video signal; and decoding said modulated code to reproduce one of said first code and said second code, said first code being decoded so as to perform said time correction function in response to user activation of a time correction key one time and said second code being decoded so as to perform said program reservation function in response to user activation of a reservation key one time.

* * * * *